2,787,612

SULFURIZATION OF TWO DIFFERENT p-HY-DROXYPHENYL ARYLAMINO COMPOUNDS

Hans Bosshard, Basel, Switzerland, assignor to J. R. Geigy A. G., Basel, Switzerland, a Swiss firm No Drawing. Application May 26, 1954, Serial No. 432,609

Claims priority, application Switzerland June 12, 1953

5 Claims. (Cl. 260—134)

The present invention is concerned with a process for the production of sulphur dyestuffs which have new shades and, according to the composition, improved fastness properties.

It has been found that a new type of sulphur dyestuffs can be produced by reacting alkali polysulphides by known methods in the presence of organic solvents while heating with a mixture consisting of two different p-hydroxyphenyl arylamino compounds of the general formula:

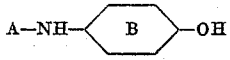

which contain no acid water-solubilising groups such as carboxyl or sulphonic acid groups and wherein A represents on the one hand a phenyl radical substituted if desired by alkyl or halogen, and on the other hand a benzene ring different therefrom, in particular one containing a secondary or tertiary amino group in the p-position, which benzene ring can also be part of a naphthalene, anthracene or carbazole ring. The annulated rings A should be bound, with regard to the —NH group, to the m- and p-positions of the benzene ring A and the carbazole nitrogen should be bound to the p-position. The aromatic rings can also be further substituted by halogen and alkyl groups.

A particular method of performing the process consists in using instead of the p-hydroxyphenyl arylamino compounds of the above formula, the whole or part of their primary sulphurisation products, that is the easily produced 2-hydroxydiphenthiazines or paraquinoid oxidation products, that is p-quinone arylimines, indophenols or diphenthiazones.

The process according to the present invention is characterised therefore by the use of a p-hydroxydiphenylamine compound which does not have the character of an indophenol or leucoindophenol, as one component whilst as the other either a p-hydroxydiphenylamine compound different from the first compound according to the above definition or also a p-hydroxyphenyl naphthyl or -anthramine compound or an indophenol or a leucoindophenol can be used.

4-hydroxydiphenylamine and nuclear substituted derivatives can be used as p-hydroxydiphenylamine compound not having the character of an indophenol, e. g. the alkyl homologues and halogen substitution products, in which compounds the substitution of the p-position by the hydroxy or amino group is excluded according to the definition. Suitable components in the benzene ring containing no hydroxyl groups are the methyl substituted 4-hydroxydiphenylamines, of these in particular, the monomethyl substituted compounds. For example, 2′.4′- or 3′.4′- or 2′.5′- dimethyl-4-hydroxydiphenylamine, in particular however, with advantage the 2′- or 3′- and preferably the 4′-methyl-4- hydroxydiphenylamine can be used. These 4-hydroxydiphenylamine compounds can be used in the form of their primary sulphurisation products as 2-hydroxydiphenthiazines which can be easily produced by methods known per se from 4-hydroxydiphenylamines. They can be produced for example as a result of the reaction with sulphur chloride in the presence of aluminium chloride in inert organic solvents, the reaction being performed under mild conditions. Also paraquinoid oxidation products of 2-hydroxydiphenthiazines can be used, e. g. diphenthiazones, such as are obtained by condensation of halogen substituted p-benzoquinones with o-aminothiophenols, and in particular the 1. 3. 4-trichlorodiphen-2-thiazones obtained with chloranil.

The indophenols which can be used according to the present invention, advantageously in the leuco form, are very numerous, for example the condensation products obtained by methods known per se from p-nitrosophenol with secondary and tertiary aromatic amines having the p-position to the amino group free such as dialkyl anilines, alkyl benzyl anilines, diphenylamines, carbazoles, etc. Of these, favourable components are indophenols obtained from diphenylamines by condensation with p-nitrosophenol, in particular those from diphenylamines which are alkyl substituted at the nitrogen atom as well as those obtained from carbazoles and from N-alkyl carbazoles. Also the aromatic rings of these compounds can contain the further substituents which are usual, e. g. halogen or alkyl groups.

The ratio of the components in the mixture can vary within wide limits; but it is of advantage to select the equimolecular ratio of the components. However, considerable variations from this ratio can also produce valuable end products.

It is of advantage to perform the sulphurisation in the presence of water-soluble organic solvents which boil at over 100° C. under atmospheric pressure, preferably in the presence of higher boiling aliphatic alcohols such as butanol, and preferably in the presence of ethylene glycol monoalkyl ethers such as monomethyl or monoethyl ether. Preferably alkali polysulphides with a sulphur content corresponding to that of penta to hepta sulphide can be used as sulphurisation agent. It is advantageous to work in an open vessel under reflux and in the presence of such an amount of water that a boiling temperature of from 110 to 125° C. is attained. The duration of the sulphurisation process depends on the sulphur content of polysulphide, on the reactivity of the components used and on the organic solvent used. It is of advantage to determine it from case to case by a series of trials. It takes several hours, e. g. from 12 to 48 hours. To work up the sulphur melt, it is diluted with water in the usual way, the organic solvent is removed and the dyestuff is isolated which can be done, for example, by airing the alkaline sodium sulphide vat. If necessary the dyestuff can also be oxidised afterwards.

The process according to the present invention enables new, mixed sulphur dyestuffs to be produced. The dyeings attained therewith are distinguished by new, generally full rich shades according to the composition, and by improved fastness properties of the cellulose dyeings, e. g. by improved wet and chlorine fastness properties. In many ways, their behavour on dyeing is better than that of a corresponding mixture of sulphur dyestuffs which has been individually produced.

The following examples illustrate the invention without limiting it in any way. Where not otherwise stated, the parts are given as parts by weight and the temperatures are in degrees centigrade. The relationship of parts by weight to parts by volume is as that of kilogrammes to litres.

*Example 1*

48 parts of sulphur and 59.4 parts of the leuco indophenol of the formula:

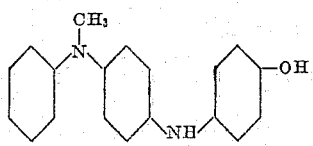

and 40.6 parts of 4-hydroxy-4'-methyldiphenylamine are added to a filtered polysulphide solution consisting of a further 88 parts of sulphur, 103 parts of tech. sodium sulphide (60%), 200 parts of ethylene glycol monoethyl ether and 50 parts of water. The melt is heated under reflux and the boiling point is fixed at 115° by the addition of some water. After sulphurising for 48 hours, 20 parts of sodium sulphide (100%) are added and the whole is steam distilled and the dyestuff is isolated by airing. The raw dyestuff so obtained after being filtered, is made up to a volume of 1200 parts with water and, after adding 15 parts of caustic soda, is well aired at 15–25° by stirring for 10 hours. The pH value of the suspension is adjusted to 4–5, the dyestuff is filtered off and dried. Dyed according to the methods described in Examples 8 or 9, it produces reddish navy blue shades which have good fastness properties, in particular a fastness to soda boiling and chlorine which is extraordinary for sulphur dyestuffs.

The dyestuff is considerably more pure and has better fastness properties than the corresponding mixture of sulphur dyestuffs which is separately produced from the two components according to the same sulphurisation method.

A dyestuff with similar properties is obtained in the manner described above on the use of 40.6 parts of 4-hydroxy-3'-methyldiphenylamine or 37.8 parts of 4-hydroxydiphenylamine instead of 4-hydroxy-4'-methyldiphenylamine.

If in the above example, instead of the 4-(p-hydroxyphenylamino)-N-methyldiphenylamine, 62.2 parts of 4-(p-hydroxyphenylamino)-3'-methyl-N-methyldiphenylamine are used, then a dyestuff with similar properties is obtained whilst with 62.2 parts of 4-(p-hydroxyphenylamino)-2'-methyl-N-methyldiphenylamine or with 58 parts of 4-(p-hydroxyphenylamino)-diphenylamine somewhat more red and more pure dyestuffs are obtained.

When judged according to the chromatogram, the sulphur dyestuffs obtained according to this example are uniform to a great extent in spite of being built up from 2 components and have better properties than the corresponding mixture of the dyestuffs produced separately from the individual components.

*Example 2*

If 80 parts of 4-(p-hydroxyphenylamino)-N-methyldiphenylamine and 20 parts of 4-hydroxy-4'-methyldiphenylamine are sulphurised as described in Example 1 and otherwise the same procedure is followed, a blue sulphur dyestuff is obtained which dyes cellulose fibres in somewhat more greenish and more pure shades in comparison with the dyestuff according to the paragraph 1 of Example 1. The dyeings have similar properties. The corresponding mixture of the individual components produced separately, produces a considerably more dull shade and the wet fastness is worse.

*Example 3*

38 parts of 4-hydroxy-4'-methyldiphenylamine and 62 parts of 4-(p-hydroxyphenylamino)-3'-chloro-N-methyldiphenylamine are sulphurised according to Example 1 and the dyestuff is worked up as described. Dyed on to cellulose fibres according to the method described in Example 8 or 9, reddish, navy blue shades are obtained which have good general fastness properties and an extraordinary fastness to chlorine. If 62 parts of 4-(p-hydroxyphenylamino) - 4' - chloro - N - methyldiphenylamine are used instead of the 3'-chloro compound, a dyestuff with similar properties and a somewhat more greenish shade is obtained.

*Example 4*

A sodium polysulphide solution is produced from 95 parts of sulphur with 106 parts of tech. sodium sulphide (60%) 250 parts of ethylene glycol monomethyl ether and 50 parts of water. 60 parts of sulphur and 42 parts of 4-hydroxy-4'-methyldiphenylamine and 58 parts of 3-(4'-hydroxyphenylamino)-carbazole are added to the clarified solution whereupon the mixture is boiled under reflux for 48 hours. The boiling point is kept at 110° by the addition of some water. The dyestuff is processed as described in Example 1. It produces cellulose dyeings of a very reddish blue shade which have good fastness properties.

A very similar dyestuff is obtained if in the above example instead of 42 parts of 4-hydroxy-4'-methyldiphenylamine the same number of parts of 4-hydroxy-3'-methyldiphenylamine are used.

*Example 5*

54 parts of 2-(4'-hydroxyphenylamino)-naphthalene and 46 parts of 4-hydroxy-4'-methyldiphenylamine are added to a sodium polysulphide solution obtained from 138 parts of sulphur, 107 parts of tech. sodium sulphide (58%) and 180 parts of ethylene glycol monoethyl ether. The melt is boiled under reflux while keeping the boiling point at 117° by the addition of water. After sulphurising for 36 hours the organic solvent is removed by steam distillation and the dyestuff is isolated by airing the vat. The dyestuff dyes cellulose fibres according to the method described in Example 8 or 9 in violetty dark brown shades which have very good fastness properties in particular the dyeings have a fastness to chlorine which has not previously been attained by brown sulphur dyestuffs.

If 70 parts of 2-(4'-hydroxyphenylamino)-naphthalene and 30 parts of 4-hydroxy-4'-methyldiphenylamine are used according to the above process then a product is obtained which dyes a black-brown colour. The dyeings have similar properties.

If a sulphurisation temperature of 130° is chosen instead of 117°, a dyestuff with a more yellowish shade is obtained.

If 58 parts of 2-(4'-hydroxyphenylamino)-naphthalene and 42 parts of 4-hydroxy-2'.4'-dimethyldiphenylamine or a similar amount of 4-hydroxy-2'4'.5'-trimethyldiphenylamine are used and the same procedure is followed, products having a more yellowish shade and similar properties are obtained.

*Example 6*

31 parts of 2-hydroxy-7.8-benzo-thiodiphenylamine and 69 parts of 4-hydroxy-3'-methyldiphenylamine are sulphurised as described in Example 5. A sulphur dyestuff is obtained which dyes cellulose fibres in black-brown shades which have very good fastness properties. In particular the dyeings have good fastness to chlorine.

*Example 7*

If a mixture of 72 parts of 4-hydroxy-2'.4'-dimethyldiphenylamine and 28 parts of 4-hydroxy-2'.5'-dimethyldiphenylamine which corresponds to a product obtained from a technical xylidine mixture is sulphurised according to the process described in Example 5, a dyestuff is obtained which dyes vegetable fibres in reddish brown shades. The dyeings have good fastness properties.

If instead of 28 parts of 4-hydroxy-2'.5'-dimethyldiphenylamine, 40 parts of 4-hydroxy-4'-methyldiphenylamine are used, a similar dyestuff is obtained.

Example 8

3 parts of the dyestuff obtained according to example 1, first paragraph, are added to 90 parts of water, 9 parts of crystallised sodium sulphide, 6 parts of soda calc. and the whole is heated until a complete solution is obtained, during which the vat turns a dirty yellow-green colour. 2900 parts of hot water are added to this stock vat. 100 parts of cellulose material are treated at about 90° in the dyebath thus prepared for 45 minutes, during which time 10–60 parts of Glauber's salt or sodium chloride can be added. The dyed goods are wrung out and oxidised in the air for 15 minutes whereupon they develop a dark blue shade. After rinsing well and possibly soaping and then drying, a navy blue dyeing is obtained which is distinguished in particular by good fastness to chlorine and soda boiling.

The dyestuffs according to Examples 2 to 7 can be dyed in an analogous manner.

Example 9

10 parts of alcohol or a wetting agent, e. g. Turkey red oil, and 150 parts of water at 70° are added to 3 parts of the dyestuff obtained according to Example 1, paragraph 1. By the addition of 9 parts by volume of caustic soda lye (36° Bé.) and 6 parts of hydrosulphite conc., a clear yellow stock vat is obtained to which 2800 parts of a dyebath containing 6 ml. of caustic soda lye (36° Bé.) and 3 g. of hydrosulphite per litre are added. The vegetable fibres are dyed for about 45 minutes at 60°. After wringing, airing, rinsing and possibly soaping, a dyeing of dark blue shade is obtained the same as that of the sodium sulphide dyeing. The dyeing has the same excellent fastness properties.

Soda can also be used instead of caustic soda lye both in the stock vat and in the dyebath.

Glauber's salt or sodium chloride can be added in the usual manner to improve the drawing power of the baths. The dyestuffs obtained according to Examples 2 to 7 can be dyed in an analogous manner.

What I claim is:

1. A sulphur dyestuff obtained by reacting while heating to a temperature above about 100° and up to 130° C. an alkali polysulphide in the presence of an organic solvent selected from the group consisting of water-soluble alcohols and ether alcohols which boil at over 100° C. under atmospheric pressure with a mixture consisting of two different p-hydroxyphenyl arylamino compounds of the general formulae:

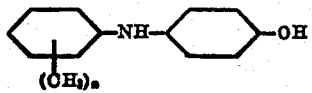

wherein $n$ is an integer from 0 to 3 inclusive and

wherein A represents a member selected from the group consisting of dimethylphenyl, 2-naphthyl, 3-carbazolyl, N-methyl-N-phenyl-aminophenyl, N-tolyl-N-methyl-aminophenyl, N-xylyl-N-methyl-aminophenyl and N-chlorophenyl-N-methyl-aminophenyl radicals.

2. A sulphur dyestuff obtained by reacting while heating to substantially 115° C. an alkali polysulphide in the presence of ethylene glycol monomethyl ether with a mixture consisting of two different p-hydroxyphenyl arylamino compounds of the formulae:

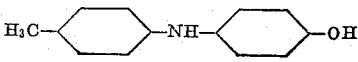

and

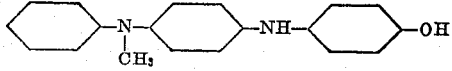

3. A sulphur dyestuff obtained by reacting while heating to substantially 117° C. an alkali polysulphide in the presence of ethylene glycol monoethyl ether with a mixture consisting of two different p-hydroxyphenyl arylamino compounds of the formulae:

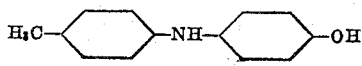

and

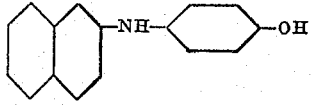

4. A sulphur dyestuff obtained by reacting while heating to substantially 110° C. an alkali polysulphide in the presence of ethylene glycol monomethyl ether with a mixture consisting of two different p-hydroxyphenyl arylamino compounds of the formulae:

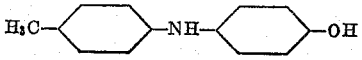

and

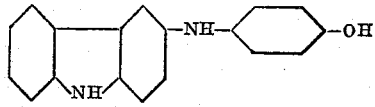

5. A sulphur dyestuff obtained by reacting while heating to substantially 117° C. an alkali polysulphide in the presence of ethylene glycol monoethyl ether with a mixture consisting of two different p-hydroxyphenyl arylamino compounds of the formulae:

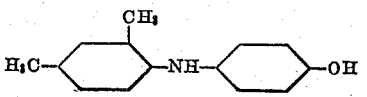

and

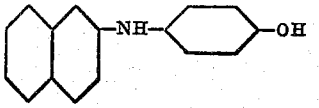

References Cited in the file of this patent

UNITED STATES PATENTS

| | | |
|---|---|---|
| 2,055,746 | Hagge | Sept. 29, 1936 |
| 2,156,071 | Strouse | Apr. 25, 1939 |

FOREIGN PATENTS

| | | |
|---|---|---|
| 15,752 | Great Britain | Aug. 5, 1915 |